(12) United States Patent
Choi et al.

(10) Patent No.: US 11,063,250 B2
(45) Date of Patent: Jul. 13, 2021

(54) CATHODE ACTIVE MATERIAL FOR LITHIUM SECONDARY BATTERY AND LITHIUM SECONDARY BATTERY COMPRISING THE SAME

(71) Applicant: ECOPRO BM CO., LTD., Cheongju-si (KR)

(72) Inventors: Moon Ho Choi, Cheongju-si (KR); Jun Won Suh, Cheongju-si (KR); Jung Han Lee, Cheongju-si (KR); Ji Hyun Nam, Cheongju-si (KR); Sung Jin Jang, Cheongju-si (KR); Seung Woo Choi, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 136 days.

(21) Appl. No.: 16/191,920

(22) Filed: Nov. 15, 2018

(65) Prior Publication Data

US 2019/0148717 A1    May 16, 2019

(30) Foreign Application Priority Data

Nov. 15, 2017   (KR) .................. 10-2017-0152435
May 23, 2018    (KR) .................. 10-2018-0058622

(51) Int. Cl.
  *H01M 4/36*     (2006.01)
  *H01M 4/505*    (2010.01)
  (Continued)

(52) U.S. Cl.
  CPC .......... *H01M 4/364* (2013.01); *C01G 53/006* (2013.01); *H01M 4/0471* (2013.01);
  (Continued)

(58) Field of Classification Search
  CPC .... H01M 4/364; H01M 4/505; H01M 4/0471; H01M 10/052; H01M 4/525;
  (Continued)

(56) References Cited

U.S. PATENT DOCUMENTS 8,871,113 B2 * 10/2014 Kim ................... C01G 45/1228
                                                        252/182.1
2006/0115730 A1 * 6/2006 Taniguchi ............. H01M 4/525
                                                        429/217

(Continued)

FOREIGN PATENT DOCUMENTS

KR    10-2014-0081663      *  7/2014   ............ H01M 4/525
KR    10-2014-0098433 A      8/2014

OTHER PUBLICATIONS

English machine translation of KR 10-2014-0081663 (Year: 2014).*

*Primary Examiner* — Michael L Dignan
(74) *Attorney, Agent, or Firm* — Saliwanchik, Lloyd & Eisenschenk

(57) ABSTRACT

The present invention relates to a cathode active material composition for a lithium secondary battery and a lithium secondary battery including the same, and more particularly, to a cathode active material composition for a lithium secondary battery, including a mixture of particles which are different in Ni composition and size and prepared at the same heat treatment temperature, and a lithium secondary battery including the same. According to the present invention, optimal capacity manifestation temperatures of a coarse particle and a fine particle may be adjusted to be similar by adjusting an Ni content of the coarse particle and the fine particle, and thus, a lithium secondary battery having enhanced output and lifetime may be manufactured.

6 Claims, 5 Drawing Sheets

(51) Int. Cl.
  *H01M 4/04*   (2006.01)
  *H01M 10/052*  (2010.01)
  *H01M 4/525*  (2010.01)
  *C01G 53/00*  (2006.01)
  *H01M 4/02*   (2006.01)

(52) U.S. Cl.
  CPC ........... *H01M 4/505* (2013.01); *H01M 4/525* (2013.01); *H01M 10/052* (2013.01); *C01P 2004/61* (2013.01); *C01P 2004/80* (2013.01); *H01M 2004/028* (2013.01)

(58) Field of Classification Search
  CPC ............ H01M 2004/028; C01G 53/006; C01P 2004/61; C01P 2004/80
  See application file for complete search history.

(56) References Cited

U.S. PATENT DOCUMENTS

| | | | | |
|---|---|---|---|---|
| 2009/0068561 A1* | 3/2009 | Sun | ................. | H01M 4/505 |
| | | | | 429/223 |
| 2014/0212749 A1* | 7/2014 | Choi | ................. | C01G 53/50 |
| | | | | 429/211 |
| 2015/0010819 A1* | 1/2015 | Lee | ................. | H01M 4/505 |
| | | | | 429/221 |
| 2015/0340686 A1* | 11/2015 | Sun | ................. | C01G 45/1228 |
| | | | | 429/223 |

\* cited by examiner

CATHODE ACTIVE MATERIAL FOR LITHIUM SECONDARY BATTERY AND LITHIUM SECONDARY BATTERY COMPRISING THE SAME

CROSS-REFERENCE TO RELATED APPLICATIONS

This application claims the benefit under 35 U.S.C. § 119 of Korean Application Nos. 10-2017-0152435, filed Nov. 15, 2017; and 10-2018-0058622, filed May 23, 2018; which are hereby incorporated in their entirety.

BACKGROUND OF THE INVENTION

Field of the Invention

The present invention relates to a cathode active material composition for a lithium secondary battery and a lithium secondary battery including the same, and more particularly, to a cathode active material composition for a lithium secondary battery, including a mixture of particles which are different in Ni composition and size and heat-treated at the same temperature, and a lithium secondary battery including the same.

Description of the Related Art

Secondary batteries, especially, lithium secondary batteries, are widely used in the fields of small-sized high-end electronic devices such as mobile devices, notebook computers, and the like. Development of mid- and large-sized batteries is also in progress. In particular, development of high capacity electrochemically stable lithium secondary batteries is underway due to the spread of electric vehicles (EV).

A cathode active material, among the components of a lithium secondary battery, plays an important role in the battery, in determining capacity and performance of the battery.

Secondary battery manufacturers have increased capacity of secondary batteries by enhancing a mix density of a cathode plate on the basis of optimization of an average particle size and a particle size distribution.

Lithium cobalt oxide ($LiCoO_2$), which has excellent physical properties such as excellent cycle characteristics, and the like, has been commonly used as a cathode active material. However, cobalt used in $LiCoO_2$ is so-called a rare metal, which is small in the amount of reserves and areas of production thereof are unevenly distributed, and thus, is unstable in terms of supply. Such an unstable supply of cobalt and an increase in the demand for lithium secondary batteries cause $LiCoO_2$ to be expensive.

In this context, research into a cathode active material which may replace $LiCoO_2$ has steadily been conducted, and the use of a lithium-containing manganese oxide such as $LiMnO_2$, $LiMn_2O_4$ having a spinel crystal structure, and the like, and a lithium-containing nickel oxide ($LiNiO_2$) has also been considered but $LiNiO_2$ is difficult to apply to an actual mass-production process at a reasonable cost in terms of characteristics according to a manufacturing method thereof and lithium manganese oxides such as $LiMnO_2$, $LiMn_2O_4$, and the like, have poor cycle characteristics, and the like.

Recently, a method of using a lithium composite transition metal oxide or a lithium transition metal phosphate containing two or more transition metals such as nickel (Ni), manganese (Mn), and cobalt (Co) as a cathode active material as a typical substitute material has been studied, and, in particular, the use of a layered oxide of three-component system of Ni, Mn, and Co has been steadily researched.

Meanwhile, in order to increase energy density of a cathode active material, it is advantageous to increase density by appropriately mixing fine particles (or small particles) and coarse particles (or large particles). Coarse particles and fine particles each have an optimal heat treatment temperature according to the content of nickel. Since a specific surface area of the fine particles is larger than that of the coarse particle, the fine particles may absorb a larger amount of lithium even at a relatively low heat treatment temperature. However, a temperature range in which an optimal capacity of the fine particles is manifested is inevitably lower than that of the coarse particles.

Also, since a temperature range for achieving optimal performance in a mixed composition depends on the temperature of the coarse particles having a high mixture ratio, the fine particles having a relatively low mixture ratio are difficult to achieve optimal performance in the mixed composition.

Therefore, it is necessary to develop a cathode active material which may satisfy optimal temperatures of both coarse particles and fine particles.

The inventors of the present application have made intensive studies to overcome the problems of the related art and completed the present invention upon recognizing that, in the case of a cathode active material composition for a lithium secondary battery in which an Ni composition of coarse particles and fine particles and a ratio of fine particles in a mixed composition are adjusted, a mixed composition enhanced in power and life time was able to be prepared by optimizing a heat treatment temperature by adjusting the composition of Ni of the coarse particles and fine particles.

RELATED ART DOCUMENT

Patent Document (Patent document 1) KR10-2014-0098433 A

SUMMARY

An aspect of the present invention provides a novel cathode active material composition including particles having different sizes, in which compositions are different according to sizes of the particles.

Another aspect of the present invention provides a lithium secondary battery including the cathode active material.

According to an aspect of the present invention, there is provided a cathode active material composition including particle 1 represented by Chemical Formula 1 below and particle 2 represented by Chemical Formula 2 below:

   [Chemical Formula 1]

   [Chemical Formula 2]

(where $0.6 \leq x1 \leq 0.99$, $0.59 \leq x2 \leq 0.98$, $0.5 \leq a1 \leq 1.5$, $0.5 \leq a2 \leq 1.5$, $0.0 \leq y1 \leq 0.3$, $0.0 \leq y2 \leq 0.3$, $0.0 \leq z1 \leq 0.3$, $0.0 \leq z2 \leq 0.3$, $0.0 \leq 1-x1-y1-z1 \leq 0.3$, $0.0 \leq 1-x2-y2-z2 \leq 0.3$, and M is one or more elements selected from the group consisting of B, Ba, Ce, Cr, F, Mg, Al, Cr, V, Ti, Fe, Zr, Zn, Si, Y, Nb, Ga, Sn, Mo, W, P, Sr, and combination thereof), wherein x1 and x2 satisfy the condition of $0.01 \leq x1-x2 \leq 0.4$.

In a related art mixed composition of coarse particles and fine particles, temperature ranges in which the coarse particles and fine particles express an optimal capacity are different and it depends on the temperature range of the coarse particles having a high mixture ratio, and thus, it is difficult to exhibit optimal performance of the fine particles in the mixed composition.

Thus, the inventors of the present application have found that a lithium secondary battery having enhanced output and life time can be manufactured by controlling heat treatment temperatures of coarse and fine particles to be equal, while adjusting optimal capacities of the coarse and fine particles by adjusting a nickel composition of the coarse and fine particles, thus completing the present invention.

In the cathode active material for a lithium secondary battery, x1 and x2 may satisfy the conditions of $0.01 \leq x1-x2 \leq 0.4$.

That is, in the cathode active material for a lithium secondary battery, an Ni composition of the particle 2 may be less than an Ni composition of the particle 1 by 1 to 40%, and preferably, by 5 to 40%.

In the cathode active material for a lithium secondary battery, a ratio of the particle 2 may be 1 to 40 wt % with respect to a total weight of the mixed composition, and may be preferably, 5 to 40 wt %.

According to an experimental example of the present invention, an expression of optimal capacity according to the ratio of the fine particles in the mixed composition was checked, and here, it was found that when the Ni composition of the fine particles was 5% less than that of the coarse particles and the ratio of the fine particles was 20 to 40%, an optimal capacity was expressed, but although the ratio of the fine particles was 20 mal %, if the Ni composition of the fine particles was equal to or 10 mol % less than that of the coarse particles, the optimal capacity was not expressed.

It was also checked that output characteristics and life characteristics were improved when the Ni composition of the fine particles was 5% less than that of the coarse particles and the ratio of the fine particles was 20%. These results indicate that the Ni composition of the fine particles and the ratio of the fine particles mixed in the whole particles must be satisfied to exhibit the optimal capacity in the mixed composition and improve the output characteristics and the life characteristics.

In the cathode active material composition for a lithium secondary battery of the present invention, the particle 1 represented by Chemical Formula 1 may have a size of 6 um to 30 um and the particle 2 represented by Chemical Formula 2 may have a size of 1 um to 6 um.

The size of the particle 1 represented by Chemical Formula 1 and the size of the particle 2 represented by Chemical Formula 2 according to the present invention may indicate D50 values analyzed by a particle size analyzer.

In the cathode active material composition for a lithium secondary battery of the present invention, a mole fraction of the total average Ni of the cathode active material composition for a lithium secondary battery may be 60 to 99%.

In the cathode active material composition for a lithium secondary battery of the present invention, an optimal capacity expression temperature of the coarse particles and the fine particles of the cathode active material according to the present invention may be 860 to 720° C.

According to an experimental example of the present invention, an optimal capacity expression temperature according to the nickel content of the first heat-treated product was checked and it was found that the temperature of expressing optimal performance of the first heat-treated product was changed according to the nickel content. It was also checked that when the nickel content of the fine particles is 5% less than the nickel content of the coarse particles, the optimal capacity expression temperatures of the coarse and fine particles were similar. These results indicate that the optimal performance of the fine particles can be maximized when the first heat treatment temperatures were controlled to be equal by adjusting the optimal capacity expression temperature of the fine particles to be similar to that of the coarse particles by adjusting the nickel content of the fine particles.

According to another aspect of the present invention, there is provided a lithium secondary battery including the cathode active material composition.

According to another aspect of the present invention, there is provided a method for preparing a cathode active material composition, including: preparing a first precursor represented by Chemical Formula 3 below and a second precursor represented by Chemical Formula 4 below and mixing the first and second precursors to prepare a precursor composition;

$Ni_{x1}Co_{y1}Mn_{z1}M_{1-x1-y1-z1}(OH)_2$      [Chemical Formula 3]

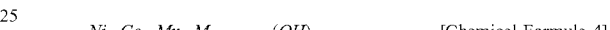
$Ni_{x2}Co_{y2}Mn_{z2}M_{1-x2-y2-z2}(OH)_2$      [Chemical Formula 4]

(Here, $0.6 \leq x1 \leq 0.99$, $0.59 \leq x2 \leq 0.98$, $0.0 \leq y1 \leq 0.3$, $0.0 \leq z1 \leq 0.3$, $0.0 \leq 1-x1-y1-z1 \leq 0.3$, $0.0 \leq y2 \leq 0.3$, $0.0 \leq z2 \leq 0.3$, and $0.0 \leq 1-x2-y2-z2 \leq 0.3$, and M is one or more elements selected from the group consisting of B, Ba, Ce, Cr, F, Mg, Al, Cr, V, Ti, Fe, Zr, Zn, Si, Y, Nb, Ga, Sn, Mo, W, P, Sr, and combinations thereof); mixing an M lithium compound and the precursor composition and performing a first heat-treatment on the mixture at a first temperature; mixing one or more elements selected from the group consisting of B, Ba, Ce, Cr, F, Mg, Al, Cr, V, Ti, Fe, Zr, Zn, Si, Y, Nb, Ga, Sn, Mo, W, P, Sr, and combinations thereof to the mixture, and performing a second heat-treatment on the mixture at a second temperature.

The method may further include: rinsing the second heat-treated mixture with distilled water and drying the rinsed mixture.

In the method for preparing a cathode active material composition according to the present invention, the first precursor and the second precursor having different particle sizes and different Ni contents are separately prepared, mixed, and first heat-treated at the same temperature.

In the cathode active material composition for a lithium secondary battery of the present invention, an optimal capacity manifestation temperature of the coarse particle and the fine particle of the cathode active material may be 860 to 720° C.

In the present invention, according to the result of checking the optimal capacity manifestation temperature according to nickel content of the cathode active material, it was confirmed that, a temperature for manifesting optimal performance of the heat-treated product is changed according to the nickel content, and when a nickel content of the fine particle is 5% less than a nickel content of a coarse particle, the optimal capacity manifestation temperatures of the coarse particle and the fine particle are similar.

From this point of view, the optimal capacity manifestation temperature of the fine particle may be controlled to be similar to the optimal capacity manifestation temperature of the coarse particle by adjusting the nickel content of the fine particle, whereby the first precursor and the second precursor may be first heat-treated at the same temperature and even the fine particle may exhibit the optimal capacity to allow the cathode active material composition to exhibit optimal performance at much as possible.

In the method for preparing a cathode active material according to the present invention, x1 and x2 may satisfy the condition of $0.01 \leq x1-x2 \leq 0.4$.

In the method for preparing a cathode active material according to the present invention, in the mixing of the precursor composition, the second precursor may be mixed in the ratio of 5 to 40 wt % with respect to a total weight of the precursor composition.

In the method for preparing a cathode active material according to the present invention, a size of the first precursor particle represented by Chemical Formula 3 may be 6 um to 30 um, and a size of the second precursor particle represented by Chemical Formula 4 may be 1 um to 6 um.

The cathode active material composition for a lithium secondary battery according to the present invention includes a mixture of particles having different sizes, and by adjusting an Ni composition of the fine particle with respect to an Ni composition of the coarse particle and a mixture ratio of fine particles with respect to the overall composition of the mixture, optimal capacity manifestation temperature of the fine particle may be adjusted to be similar to that of the coarse particle, and thus, a lithium secondary battery having enhanced output and lifetime may be manufactured.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

Figure 1:
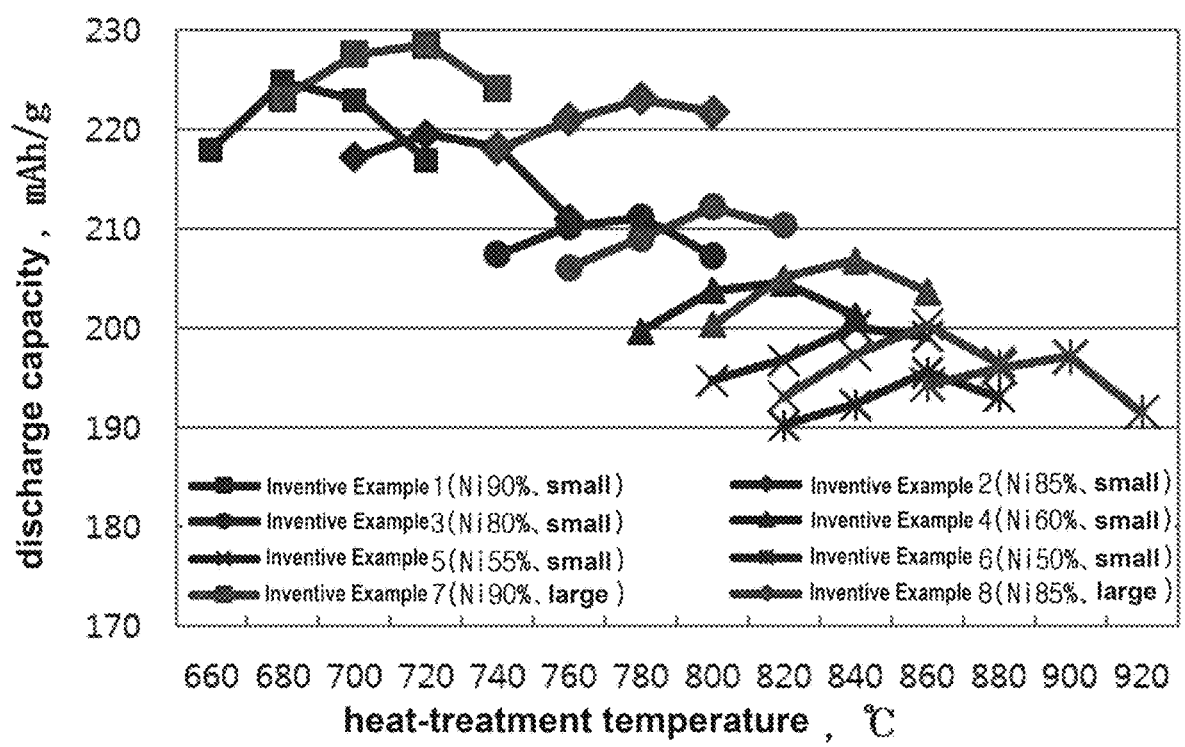
FIG. 1 is a graph illustrating results of checking discharge capacity of a cathode active material according to heat treatment temperatures.

Hereinafter, the present invention will be described in more detail through embodiments. These embodiments are only for illustrating the present invention and the scope of the present invention is not construed as being limited by these embodiments.

Preparation Example: Preparation of Cathode Active Material

To prepare a cathode active material, precursors represented by $NiCoMn(OH)_2$ were first prepared by a co-precipitation reaction. The precursors having Ni compositions as shown in Table 1 below were prepared.

TABLE 1

| Classification | precursor | Content of Ni |
|---|---|---|
| Preparation Example 1 | Fine particle | 90% |
| Preparation Example 2 | Fine particle | 85% |
| preparation example 3 | Fine particle | 80% |
| preparation example 4 | Fine particle | 60% |
| preparation example 5 | Fine particle | 55% |
| preparation example 6 | Fine particle | 50% |
| preparation example 7 | Coarse particle | 90% |
| preparation example 8 | Coarse particle | 85% |
| preparation example 9 | Coarse particle | 80% |
| preparation example 10 | Coarse particle | 60% |
| preparation example 11 | Coarse particle | 55% |
| preparation example 12 | Coarse particle | 50% |

A lithium compound of LiOH or $Li_2CO_3$ was added to the prepared precursors and first heat-treated at a heating rate of 1° C./min to 20° C./min in the presence of $N_2$ and $O_2$/(1~100 LPM) for 4 to 20 hours (with respect to a maintained range). After the first heat treatment, 0 to 10 mol % of a compound containing Al was added to the resultant mixture and subjected to a secondary heat-treatment to prepare a cathode active material for a lithium secondary battery.

Next, distilled water was prepared and maintained at a constant temperature of 5 to 40° C. Thereafter, the prepared cathode active material for a lithium secondary battery was put into distilled water and rinsed for 0.1 to 10 hours, while the temperature was maintained.

The rinsed cathode active material was filter-pressed and then dried at 50 to 300° C. for 3 to 24 hours.

Experimental Example 1: Checking of Optimal Capacity Manifestation Temperature and Discharge Capacity Experiment was conducted to check the first heat treatment temperature manifesting optimal capacity for the particles of Preparation Examples 1 to 12.

Also, a battery including the prepared particles was manufactured and capacity thereof was measured. Results thereof are shown in Table 2 below and FIG. 1.

TABLE 2

| Classification | Optimal capacity manifestation temperature (° C.) | Capacity (mAh/g) |
|---|---|---|
| Preparation example 1 (Ni 90%, fine particle) | 680 | 224.8 |
| Preparation example 2 (Ni 85%, fine particle) | 720 | 219.6 |
| Preparation example 3 (Ni 80%, fine particle) | 780 | 211.1 |
| Preparation example 4 (Ni 60%, fine particle) | 820 | 204.5 |
| Preparation example 5 (Ni 55%, fine particle) | 840 | 200.1 |
| Preparation example 6 (Ni 50%, fine particle) | 860 | 195.6 |
| Preparation example 7 (Ni 90%, coarse particle) | 720 | 228.5 |
| Preparation example 8 (Ni 85%, coarse particle) | 780 | 223.1 |
| Preparation example 9 (Ni 80%, coarse particle) | 800 | 212.2 |
| Preparation example 10 (Ni 60%, coarse particle) | 840 | 206.8 |
| Preparation example 11 (Ni 55%, coarse particle) | 860 | 200.3 |
| Preparation example 12 (Ni 50%, coarse particle) | 900 | 197.1 |

As a result, as shown in Table 2 and FIG. 1, it can be seen that, when the Ni content of the fine particles is about 5% less than that of the coarse particles, the primary heat treatment temperature that manifests an optimal capacity of the fine particles is similar to that of the coarse particles.

Comparative Examples 1 to 4 and Inventive Examples 1 to 6: Preparation of Mixed Cathode Active Material Composition Precursors were first prepared according to the Ni compositions in Table 3 below. Thereafter, a lithium compound of LiOH or $Li_2CO_3$ was added to the prepared precursors and first heat-treated at a heating rate of 1° C./min to 20° C./min in the presence of $N_2$ and $O_2$/(1-100 LPM) for 4 to 20 hours (with respect to a maintained range). After the first heat treatment, 0 to 10 mol % of a compound containing Al was added to the resultant mixture and subjected to a secondary heat-treatment to prepare a cathode active material for a lithium secondary battery.

Next, distilled water was prepared and maintained at a constant temperature of 5 to 40° C. Thereafter, the prepared cathode active material for a lithium secondary battery was put into distilled water and rinsed for 0.1 to 10 hours, while the temperature was maintained.

The rinsed cathode active material was filter-pressed and then dried at 50 to 300° C. for 3 to 24 hours.

TABLE 3

| Classification | Composition of active material Ni:Co:Mn | Ni Composition Coarse particle | Ni Composition Fine particle | Rate of fine particle |
|---|---|---|---|---|
| Comparative Example 1 | 90:8:2 | 90.0 | 90.0 | 20 |
| Comparative Example 2 | 88:8:4 | 90.0 | 80.0 | 20 |
| Comparative Example 3 | 60:20:20 | 60.0 | 60.0 | 20 |
| Comparative Example 4 | 58:20:22 | 60.0 | 50.0 | 20 |
| Inventive Example 1 | 88:8:4 | 90.0 | 85.0 | 40 |
| Inventive Example 2 | 89:8:3 | 90.0 | 85.0 | 20 |
| Inventive Example 3 | 90:8:2 | 90.0 | 85.0 | 5 |
| Inventive Example 4 | 58:20:22 | 60.0 | 55.0 | 40 |
| Inventive Example 5 | 59:20:21 | 60.0 | 55.0 | 20 |
| Inventive Example 6 | 60:20:20 | 60.0 | 55.0 | 5 |

Experimental Example 2: Measurement of Cathode Active Material by SEM

Figure 2:
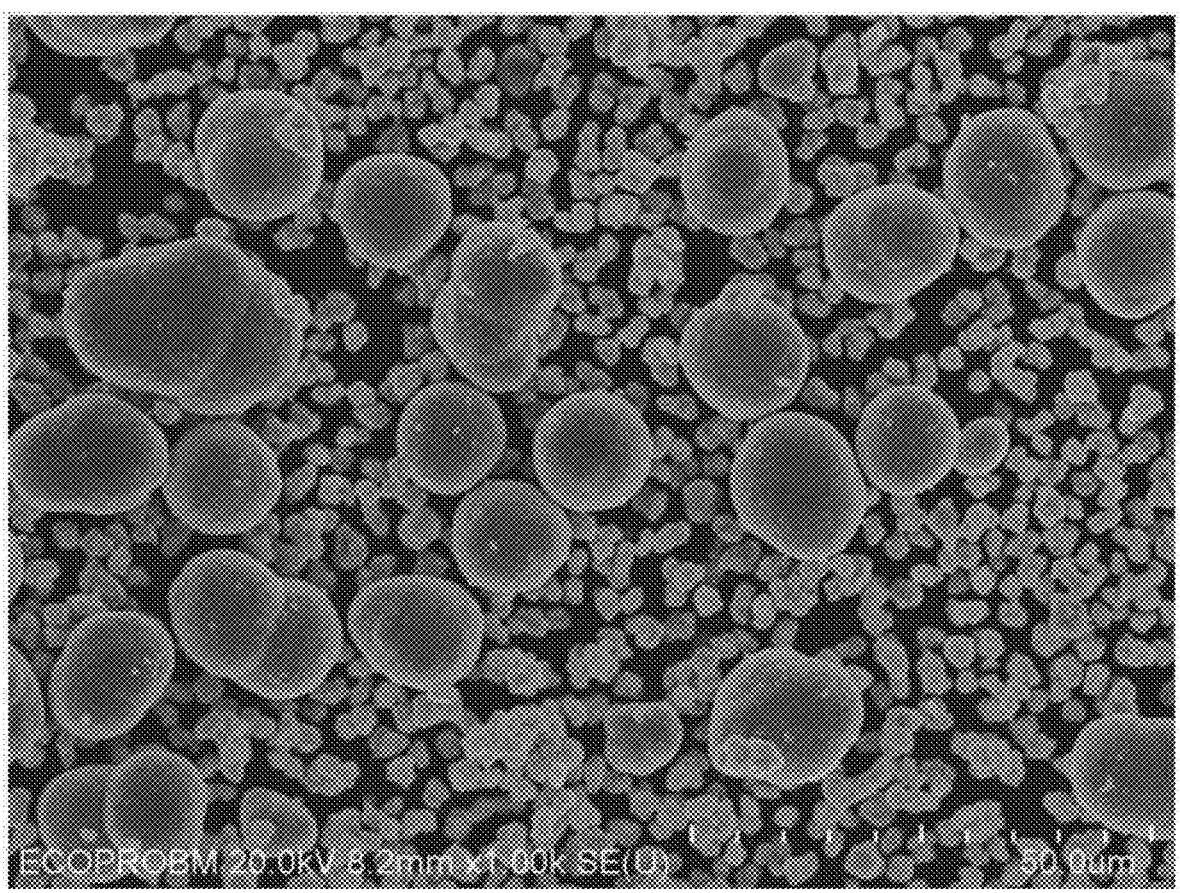
FIG. 2 is a scanning electron microscope (SEM) photograph of a cathode active material (embodiment 1) of the present invention.

In order to check particle sizes of all the cathode active materials (Inventive Example 1) prepared in the embodiment, particles were observed by a scanning electron microscope (SEM) and results thereof are illustrated in FIG. 2.

Manufacturing Example: Manufacturing of Battery

A battery containing the following mixed cathode active material composition was manufactured.

1) Preparation of Cathode Slurry [Based on 5 g] and Manufacturing of Plate 94 wt % of an active material, 3 wt % of a conductive agent (super-P), and 3 wt % of a binder (PVDF) were mixed in the ratio of 4.7 g:0.15 g:0.15 g at 1900 rpm/10 min. using an auto mixer. Thereafter, the resultant mixture was applied to an Al foil [15 um] and rolled out by a micro film applicator so as to be prepared. The prepared mixture was dried at 135° C. for four hours in a dry oven.

2) Manufacturing of Coin-Cell

A cathode was prepared by punching a coating plate by a unit area of 2 $cm^2$, a lithium metal foil was used as an anode, W-Scope-20 um polypropylene was used as a separator, and 1.15M $LiPF_6$ having a composition of EC/EMC=7/3 was used as an electrolyte. Coin cells were assembled and manufactured in an Argon-filled glove box using CR2016, CR2032 type as coin-cell sizes through a general method.

Experimental Example 3: Checking of Optimal Capacity Manifestation According to Rates of Fine Particles in Mixed Composition The optimal capacity manifestation of the coin cells of Inventive Examples 1 to 6 and Comparative Examples 1 to 4 were checked, and results thereof are shown in Table 4 below and FIG. 3.

TABLE 4

| Classification | Charge Capacity (mAh/g) | Discharge Capacity (mAh/g) | $1^{st}$ Efficiency (%) |
|---|---|---|---|
| Inventive Example 1 | 241.9 | 223.7 | 92.5 |
| Inventive Example 2 | 241.6 | 226.3 | 93.7 |
| Inventive Example 3 | 241.6 | 224.2 | 92.8 |
| Inventive Example 4 | 224.3 | 205.6 | 91.7 |
| Inventive Example 5 | 225.3 | 206.5 | 91.7 |
| Inventive Example 6 | 225.5 | 204.9 | 90.9 |
| Comparative Example 1 | 241.7 | 222.8 | 92.2 |
| Comparative Example 2 | 236.6 | 219.1 | 92.6 |
| Comparative Example 3 | 222.6 | 203.5 | 91.4 |
| Comparative Example 4 | 223.5 | 204.1 | 91.3 |

Figure 3:
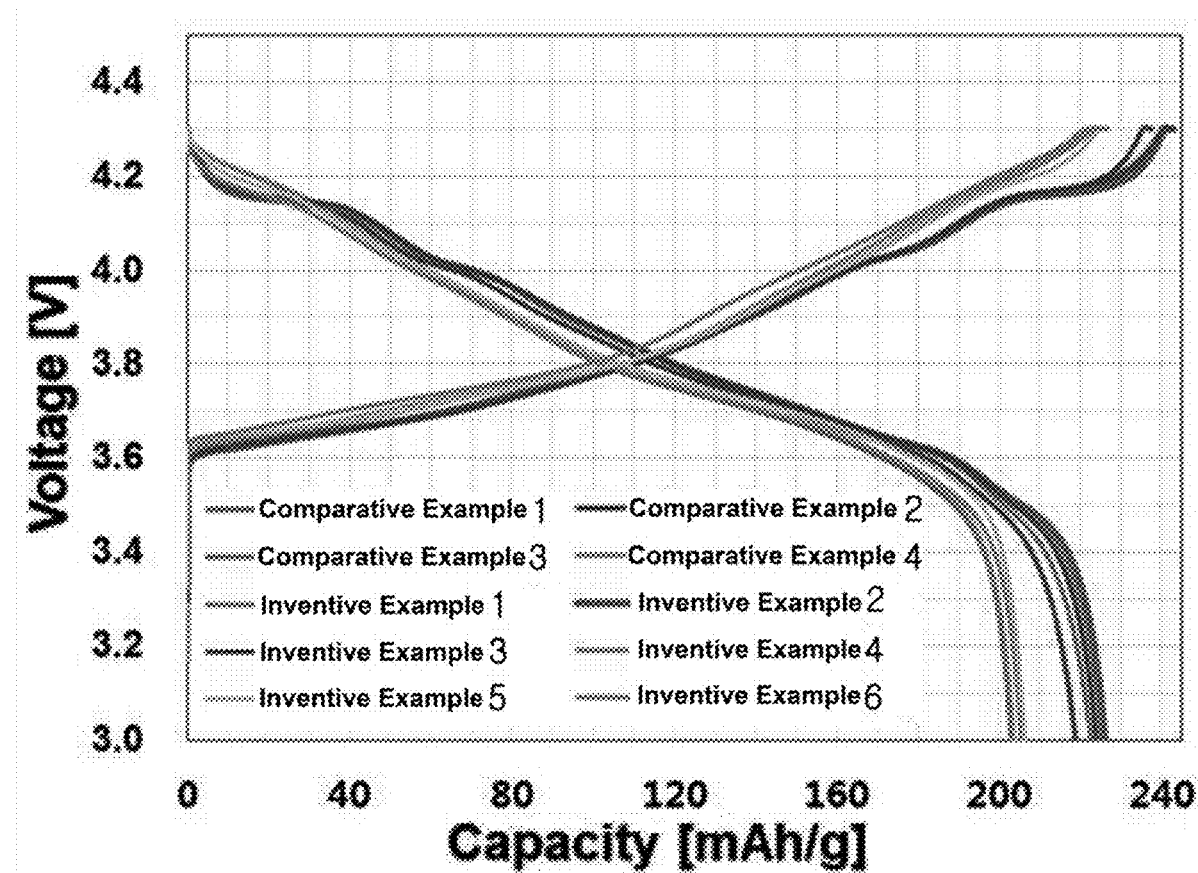
FIG. 3 is a graph illustrating results of checking manifestation of optimal capacity of a lithium secondary battery including a mixed composition of the present invention.

As shown in Table 4 and FIG. 3, it was checked that an optimal capacity was expressed when the Ni composition of the fine particles was 5% less than that of the coarse particles and the ratio of the fine particles in the mixed composition was 20%.

Figure 4:
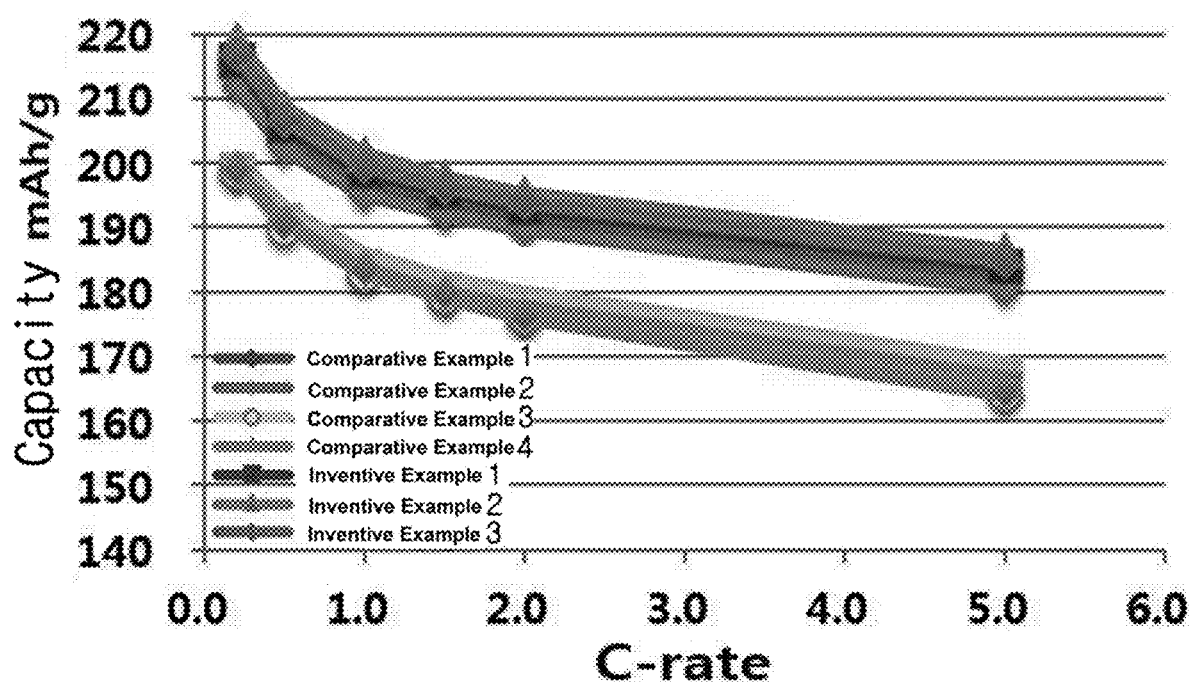
FIG. 4 is a graph illustrating results of checking output characteristics of a lithium secondary battery including a mixed composition of the present invention.

Experimental Example 4: Checking of Output Characteristics of Mixture Composition of Coarse and Fine Particles Output characteristics of the coin cells of Inventive Examples 1 to 6 and Comparative Examples 1 to 4 were checked, and results thereof are shown in Table 5 below and FIG. 4.

TABLE 5

| Classification | Unit | 0.2 C | 0.5 C | 1.0 C | 1.5 C | 2.0 C | 5.0 C |
|---|---|---|---|---|---|---|---|
| Inventive Example 1 | mAh/g | 215.9 | 205.8 | 198.6 | 195.5 | 193 | 183.8 |
| | % | 96.5 | 92 | 88.8 | 87.4 | 86.3 | 82.2 |
| Inventive Example 2 | mAh/g | 219.2 | 208.7 | 201.3 | 197.8 | 195.2 | 186.4 |
| | % | 96.9 | 92.2 | 89 | 87.4 | 86.3 | 82.4 |
| Inventive Example 3 | mAh/g | 216.9 | 206.5 | 199.5 | 196 | 193.9 | 184.8 |
| | % | 96.7 | 92.1 | 89 | 87.4 | 86.5 | 82.4 |
| Inventive Example 4 | mAh/g | 200.0 | 192.4 | 185.0 | 181.3 | 178.5 | 167.0 |
| | % | 97.2 | 93.5 | 89.9 | 88.2 | 86.8 | 81.2 |
| Inventive Example 5 | mAh/g | 200.9 | 193.1 | 186.0 | 182.3 | 179.8 | 169.2 |
| | % | 97.3 | 93.5 | 90.1 | 88.3 | 87.1 | 81.9 |
| Inventive Example 6 | mAh/g | 198.8 | 190.8 | 183.6 | 179.7 | 176.2 | 164.7 |
| | % | 97.0 | 93.1 | 89.6 | 87.7 | 86.0 | 80.4 |
| Comparative Example 1 | mAh/g | 214.7 | 204.3 | 196.6 | 193.1 | 191.1 | 181.7 |
| | % | 96.3 | 91.7 | 88.2 | 86.6 | 85.8 | 81.5 |
| Comparative Example 2 | mAh/g | 211.7 | 201.9 | 195.1 | 192 | 189.5 | 180.5 |
| | % | 96.6 | 92.2 | 89 | 87.6 | 86.5 | 82.4 |

TABLE 5-continued

| Classification | Unit | 0.2 C | 0.5 C | 1.0 C | 1.5 C | 2.0 C | 5.0 C |
|---|---|---|---|---|---|---|---|
| Comparative Example 3 | mAh/g | 198.7 | 189.9 | 182.9 | 179.3 | 176.1 | 164.2 |
| | % | 97.6 | 93.3 | 89.8 | 88.1 | 86.5 | 80.7 |
| Comparative Example 4 | mAh/g | 198.3 | 190.6 | 182.9 | 179.0 | 176.0 | 164.0 |
| | % | 97.1 | 93.4 | 89.6 | 87.7 | 86.2 | 80.3 |

Experimental Example 5: Life Characteristics of Mixed Composition of Coarse and Fine Particles Life characteristics of the coin cells of Inventive Examples 1 to 6 and Comparative Examples 1 to 4 were checked, and results thereof are shown in Table 6 below and FIG. 5.

TABLE 6

| Classification | Capacity Retention (50 cycle, %) |
|---|---|
| Comparative Example 1 | 91.7 |
| Comparative Example 2 | 89.9 |
| Comparative Example 3 | 88.2 |
| Comparative Example 4 | 89.8 |
| Inventive Example 1 | 93.7 |
| Inventive Example 2 | 95.0 |
| Inventive Example 3 | 93.1 |
| Inventive Example 4 | 94.4 |
| Inventive Example 5 | 94.9 |
| Inventive Example 6 | 94.3 |

Figure 5:
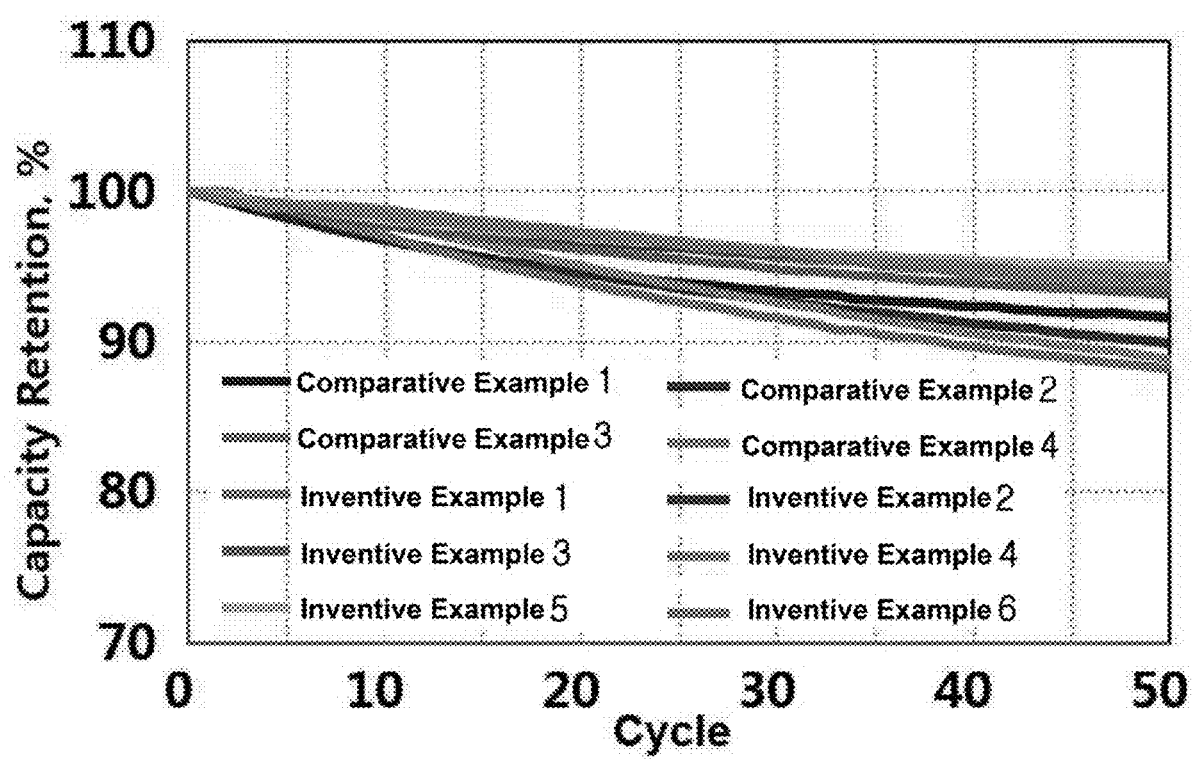
FIG. 5 is a graph illustrating results of checking life characteristics of a lithium secondary battery including a mixed composition of the present invention.

As a result, as illustrated in Table 6 above and FIG. 5, it can be seen that the life time of Inventive Example 2 is the highest.

While the present invention has been shown and described in connection with the embodiments, it will be apparent to those skilled in the art that modifications and variations may be made without departing from the spirit and scope of the invention as defined by the appended claims.

What is claimed is:

1. A cathode active material composition including particle 1 represented by Chemical Formula 1 below and particle 2 represented by Chemical Formula 2 below:

$Li_{a1}Ni_{x1}Co_{y1}Mn_{z1}M_{1-x1-y1-z1}O_2$     [Chemical Formula 1]

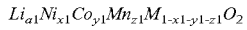

$Li_{a2}Ni_{x2}Co_{y2}Mn_{z2}M_{1-x2-y2-z2}O_2$     [Chemical Formula 2]

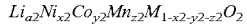

(where $0.8 \leq x1 \leq 0.99$, $0.8 \leq x2 \leq 0.98$, $0.5 \leq a1 \leq 1.5$, $0.5 \leq a2 \leq 1.5$, $0.0 \leq y1 \leq 0.3$, $0.0 \leq y2 \leq 0.3$, $0.0 \leq z1 \leq 0.3$, $0.0 \leq z2 \leq 0.3$, $0.0 \leq 1-x1-y1-z1 \leq 0.3$, $0.0 \leq 1-x2-y2-z2 \leq 0.3$, and M is one or more elements selected from the group consisting of B, Ba, Ce, Cr, F, Mg, Al, Cr, V, Ti, Fe, Zr, Zn, Si, Y, Nb, Ga, Sn, Mo, W, P, Sr, and combination thereof), wherein a size of the particle 1 represented by Chemical Formula 1 is greater than a size of the particle 2 represented by Chemical Formula 2, wherein x1 and x2 satisfy the condition of $0.01 \leq (x1-x2) < 0.1$, and wherein the particle 2 is mixed in a ratio of 5 to 40 wt % with respect to a total weight of the cathode active material composition.

2. The cathode active material composition of claim 1, wherein
the size of the particle 1 represented by Chemical Formula 1 is 6 um to 30 um and the size of the particle 2 represented by Chemical Formula 2 is 1 um to 6 um.

3. A lithium secondary battery comprising a cathode active material composition according to claim 2.

4. A lithium secondary battery comprising a cathode active material composition according to claim 1.

5. A method for preparing a cathode active material composition, the method comprising:
preparing a first precursor represented by Chemical Formula 3 below and a second precursor represented by Chemical Formula 4 below and mixing the first and second precursors to prepare a precursor composition;

$Ni_{x1}Co_{y1}Mn_{z1}M_{1-x1-y1-z1}(OH)_2$     [Chemical Formula 3]

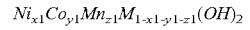

$Ni_{x2}Co_{y2}Mn_{z2}M_{1-x2-y2-z2}(OH)_2$     [Chemical Formula 4]

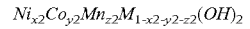

(where $0.8 \leq x1 \leq 0.99$, $0.8 \leq x2 \leq 0.98$, $0.0 \leq y1 \leq 0.3$, $0.0 \leq z1 \leq 0.3$, $0.0 \leq 1-x1-y1-z1 \leq 0.3$, $0.0 \leq y2 \leq 0.3$, $0.0 \leq z2 \leq 0.3$, and $0.0 \leq 1-x2-y2-z2 \leq 0.3$, M is one or more elements selected from the group consisting of B, Ba, Ce, Cr, F, Mg, Al, Cr, V, Ti, Fe, Zr, Zn, Si, Y, Nb, Ga, Sn, Mo, W, P, Sr, and combinations thereof), wherein x1 and x2 satisfy the condition of $0.01 \leq (x1-x2) < 0.1$, wherein in the mixing of the precursor composition, the second precursor is mixed in a ratio of 5 to 40 wt % with respect to a total weight of the precursor composition, and wherein the size of the first precursor particle represented by the chemical formula 3 is larger than the size of the second precursor particle represented by the chemical formula 4;

mixing a lithium compound and the precursor composition and performing a first heat-treatment on the mixture at a first temperature;

mixing one or more elements selected from the group consisting of B, Ba, Ce, Cr, F, Mg, Al, Cr, V, Ti, Fe, Zr, Zn, Si, Y, Nb, Ga, Sn, Mo, W, P, Sr, and combinations thereof to the mixture of the lithium compound and the precursor composition and performing a second heat-treatment on the mixture at a second temperature; and rinsing the second heat-treated mixture with distilled water and drying the rinsed mixture.

6. The method of claim 5, wherein
a size of the first precursor particle represented by Chemical Formula 3 above is 6 um to 30 um, and a size of the second precursor particle represented by Chemical Formula 4 above is 1 um to 6 um.

* * * * *